INVENTOR:
Hubert Drossbach
BY
Ross & Mestern

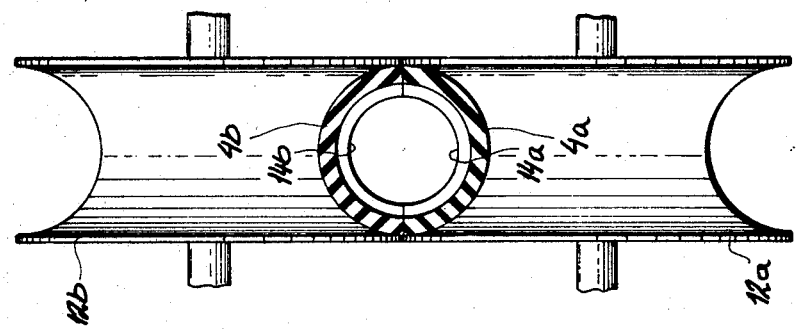
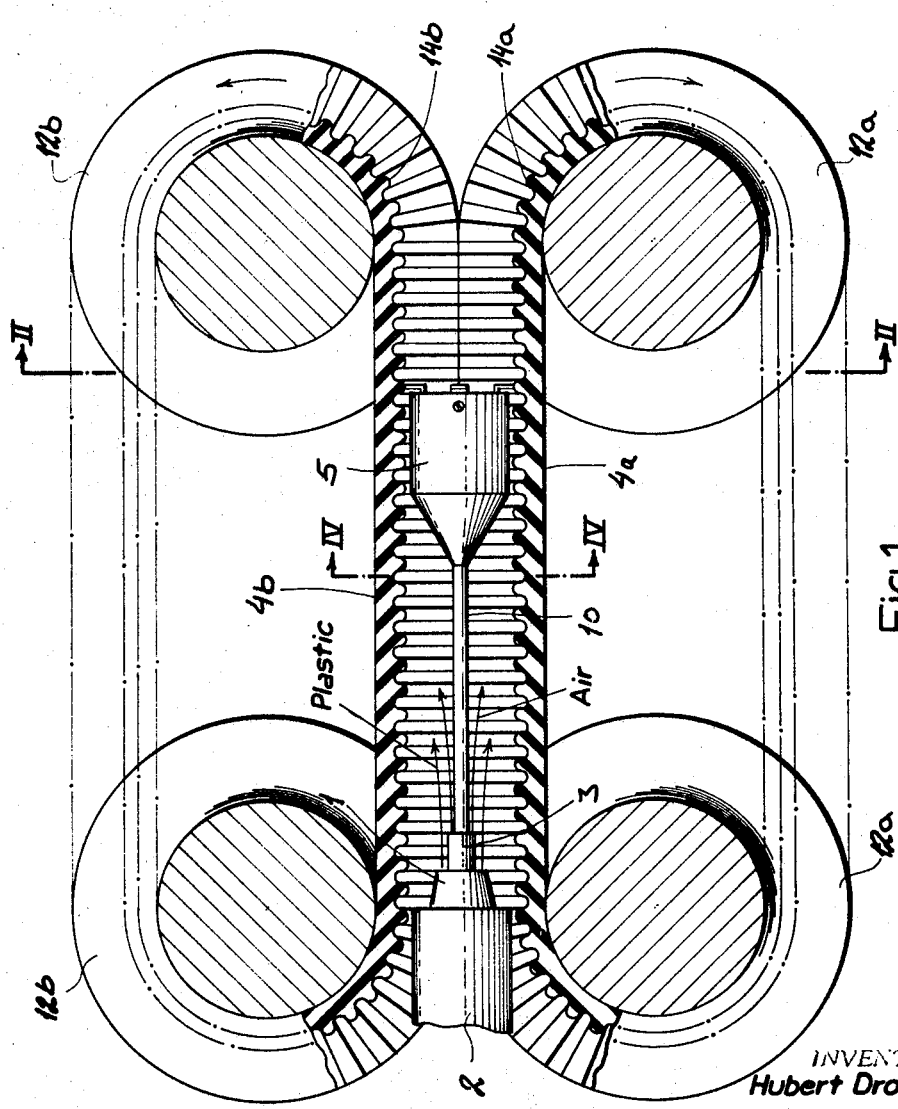

United States Patent Office 3,391,424
Patented July 9, 1968

3,391,424
APPARATUS FOR MANUFACTURING
PERFORATED TUBING
Hubert Drossbach, 8852 Rain am Lech, Germany
Filed June 16, 1966, Ser. No. 558,149
Claims priority, application Germany, June 18, 1965,
R 30,814; Great Britain, July 13, 1965, 29,654/65;
Germany, Sept. 16, 1965, R 31,332
5 Claims. (Cl. 18—19)

ABSTRACT OF THE DISCLOSURE

To produce corrugated tubing with slits at the troughs of the corrugations, plastic material expanded into tubular form by an airblast is continuously extruded into a mold consisting of two endless corrugated bands advancing together with the tubing therebetween. A floating plug in the mold cavity, located in a region of partial hardening of the extruded material, carries a set of radially projecting cutters which extend toward the inner mold wall and are resiliently biased against adjustable stops so as just to graze the inner ridges of that mold wall, thereby penetrating the tubing at the troughs of its corrugations.

---

My present invention relates to an apparatus for the manufacure of perforated tubing with annular or helicoidal corrugations, e.g. as conventionally used for drainage purposes.

In the manufacture of corrugated drainage pipes it is desirable to provide slit-like perforations, designed to facilitate the entrance of seepage water, in either the crests or the troughs of the corrugations. Locating these slits in the troughs has the advantage of protecting them from direct contact with the soil so that they will be less readily clogged by solid particles.

An object of this invention is to provide an apparatus for producing drainage pipes and similar perforated tubing in a manner which automatically forms the aforementioned slits at the external troughs or internal crests of the perforations.

A more particular object of my invention is to provide an apparatus of this description which can be readily adjusted to fit tubing of different dimensions, particularly wall thicknesses.

In conformity with this invention I provide an apparatus comprising an extruder for a hardenable plastic material, this extruder discharging into a cavity of a corrugated mold adapted to move axially, along with the plastic material and at the rate of its extrusion, in a direction away from the extruder orifice; there are further provided one or more cutters disposed in the mold cavity for slitting successive internal corrugations of the molded tubing during its displacement, the cutter or cutters extending sufficiently far toward the inner mold wall to penetrate the tubing.

The mold, which may be of the split type and constituted by a plurality of complementary mold sections preferably in the form of endless, unidirectionally moving elements, may be provided with a plug which substantially closes its cavity aganst the escape of air or other fluid admitted under pressure into the cavity from one or more blow nozzles, this pressure serving to apply the flowable plastic material onto the mold wall so that it forms thereon a seamless tubular layer having the same corrugations as the inner wall surface. In such a case it will be advantageous to use the plug as a support for the cutter or cutters, preferably with the aid of respective carrier arms biased, e.g. by their inherent resiliency, in an outward direction to urge the cutters toward the inner mold surface. Adjustable stops may be provided to limit the extent of outward displacement of the cutters.

The above and other features of my invention will become more fully apparent from the following detailed description of a representative embodiment, reference being made to the accompanying drawing in which:

FIG. 1 is an elevational view, in axial section, of the principal parts of an apparatus embodying the invention;

FIG. 2 is a cross-sectional view taken on the line II—II of FIG. 1;

Figure 3:
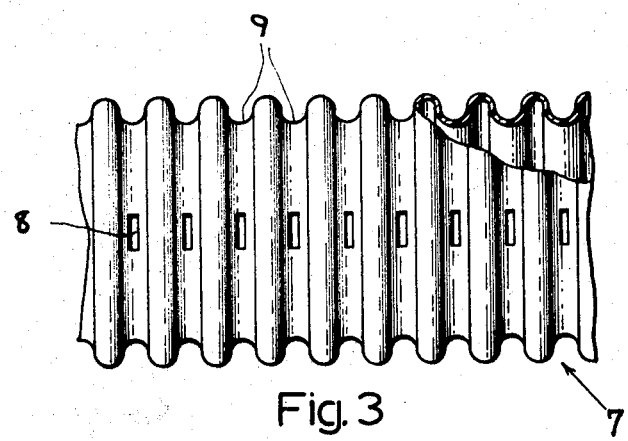
FIG. 3 is a side view of part of a perforated drainage tube produced by the apparatus of FIGS. 1 and 2.

The apparatus shown in the drawing comprises an extruder 2 with a conventional annular nozzle 1 for the discharge of a hot, semifluid plastic material into a cavity defined by two complementary mold halves 4a, 4b. Each of these mold halves is in the form of an endless band wound around a respective pair of driven rollers 12a, 12b. Air under pressure is blown into the cavity from one or more apertures in an inner core 3 of nozzle 1 and forces the issuing plastic material against the walls of mold halves 4a and 4b. The mold cavity is substantially closed, at its end remote from extruder head 2, by a plug 5 floatingly supported on a flexible, preferably elastic rod 10 which projects axially from the nozzle core 3; the radius of the cylindrical part of this plug is only slightly less than the inner radius of the semicircular ribs 14a, 14b which project inwardly from the two mold halves 4a, 4b, the difference in radii being approximately equal to the desired wall thickness of the corrugated tubing to be produced. This tubing has been illustrated at 7 in FIG. 3 and, with continuous unidirectional rotation of mold members 4a and 4b, is continuously extruded by the apparatus described.

Figure 4:
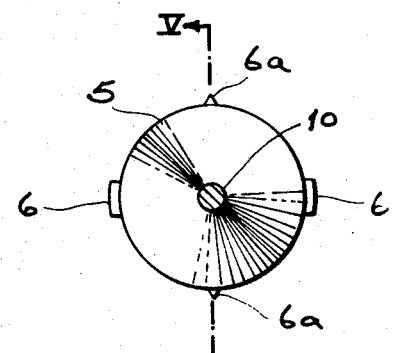
FIG. 4 is a cross-sectional view taken on the line IV—IV of FIG. 1 but drawn to a larger scale.
Figure 5:
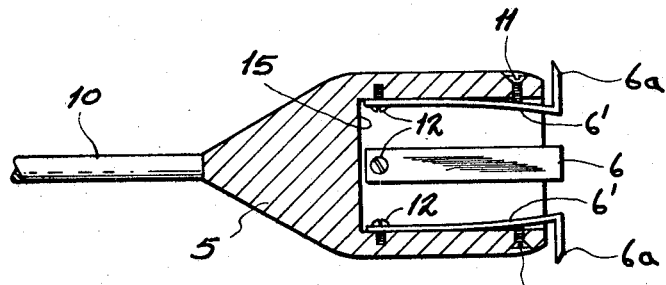
FIG. 5 is a cross-sectional view taken on the line V—V of FIG. 4.

With proper dimensioning of the supporting rod 10, plug 5 is located in a region where the extruded material has cooled only moderately so as to be still in a plastically deformable state. A set of cutters 6 and 6a angularly spaced in the downstream end of plug 5 as best seen in FIG. 4, project radially outwardly from this plug into contact with the internal crests of the ribs 14a, 14b so that slits 8 (FIG. 3) are formed in the troughs 9 of the tubing 7. The cutters 6, 6a are carried on resilient arms 6' which are secured within an axial bore 15 of plug 5 by screws 12 and whose radially outward displacement is adjustably limited by set screws 11. In the particular embodiment illustrated, relatively wide rectangular cutters 6 alternate with narrower cutters 6a of triangular profile; thus, pipe 7 will have longer slits at its sides and shorter slits at its top and bottom, yet this may be modified according to requirements. It is also possible to stagger a plurality of cutters 6 or 6a on a single arm 6' for successive deepening of a perforation 8 to be formed thereby. Naturally, the number of circumferentially spaced cutters 6 or 6a may also be changed in accordance with existing requirements.

It will be apparent that, by suitable manipulation of set screws 11, cutters 6 and 6a may be adjusted to the desired wall thickness of pipe 7 so that they will just graze the ridges 14a, 14b without penetrating into the mold members 4a, 4b. Even if these ridges are not precisely uniform, so that one or the other projects more deeply into the mold cavity, it will not be materially damaged thereby but will merely cam the cutter point inwardly against the resiliency of its supporting arm 6'. The parallel paths of the two mold halves continue beyond plug 5 to insure proper hardening of the tube 7 before the mold is opened.

I claim:
1. An apparatus for the manufacture of circumferential- ly corrugated perforated tubing of plastic material, comprising:
- corrugated mold means defining a cavity with inner peripheral ridges conforming to the profile of tubing to be manufactured;
- extruder means for discharging a hardenable plastic material into said cavity to form said tubing, said mold means being axially displaceable along with the formed tubing in a direction away from said extruder means;
- blow means for admitting a gas under pressure into said cavity, thereby distributing the plastic material over the inner surface of the mold walls;
- plug means floatingly disposed in said cavity at an intermediate point of only partial hardening of said tubing, said plug means substantially sealing said cavity against escaping fluid and being spaced from said ridges by an annular clearance for the passage of the partially hardened tubing; and
- cutter means mounted on said plug means for slitting successive internal corrugations of said tubing during displacement thereof, said cutter means extending just sufficiently toward the inner wall surface of said mold means to penetrate said tubing.

2. An apparatus as defined in claim 1 wherein said plug means is provided with at least one arm carrying said cutter means, said arm being resiliently biased outwardly for yieldably urging said cutter means into grazing contact with said ridges.

3. An apparatus as defined in claim 2, further comprising adjustable stop means on said plug means for limiting the outward displacement of said cutter means.

4. An apparatus as defined in claim 1 wherein said cutter means comprises a plurality of angularly spaced cutters.

5. An apparatus as defined in claim 1 wherein said mold means comprises a plurality of complementary mold portions constituted by concurrently movable endless members.

References Cited
UNITED STATES PATENTS

| | | | |
|---|---|---|---|
| 2,663,304 | 12/1953 | Slaughter | 18—14 AXR |
| 3,160,687 | 12/1964 | Andrews. | |
| 3,160,918 | 12/1964 | Berggren et al. | 18—14 |
| 3,188,690 | 6/1965 | Zieg | 18—14 |
| 3,243,850 | 5/1966 | Zieg | 18—14 AXR |
| 3,265,552 | 8/1966 | Berggren et al. | |

WILLIAM J. STEPHENSON, *Primary Examiner.*